United States Patent
Fining et al.

(10) Patent No.: US 11,272,229 B2
(45) Date of Patent: Mar. 8, 2022

(54) SYSTEM AND METHOD FOR PROVIDING A CUSTOMIZED MANIFEST REPRESENTING A VIDEO CHANNEL

(71) Applicant: NBCUNIVERSAL MEDIA, LLC, Universal City, CA (US)

(72) Inventors: James Fining, Universal City, CA (US); Caleb Simmeth, Universal City, CA (US)

(73) Assignee: NBCUNIVERSAL MEDIA, LLC, Universal City, CA (US)

( * ) Notice: Subject to any disclaimer, the term of this patent is extended or adjusted under 35 U.S.C. 154(b) by 0 days.

(21) Appl. No.: 16/517,505

(22) Filed: Jul. 19, 2019

(65) Prior Publication Data
US 2021/0021879 A1    Jan. 21, 2021

(51) Int. Cl.
*H04N 21/235* (2011.01)
*H04N 21/2187* (2011.01)
*H04N 21/239* (2011.01)
*H04N 21/2665* (2011.01)
(Continued)

(52) U.S. Cl.
CPC ..... *H04N 21/2353* (2013.01); *H04N 21/2187* (2013.01); *H04N 21/2393* (2013.01); *H04N 21/2665* (2013.01); *H04N 21/64753* (2013.01); *H04N 21/8455* (2013.01)

(58) Field of Classification Search
CPC ........... H04N 21/2353; H04N 21/2393; H04N 21/64753; H04N 21/2665; H04N 21/8455; H04N 21/2187
See application file for complete search history.

(56) References Cited

U.S. PATENT DOCUMENTS

2012/0137015 A1   5/2012   Sun
2013/0260796 A1*  10/2013  Hasek ............... H04L 67/32
                                                455/456.3
2014/0025836 A1   1/2014   Gupta
(Continued)

OTHER PUBLICATIONS

DVB Organisation, "ANSI/SCTE 67 2017", Recommended Practice for Digital Program Insertion for Cable, Digital Video Subcommittee, American National Standard, XP17856022, 2017, 79 pages.
(Continued)

*Primary Examiner* — Yassin Alata
(74) *Attorney, Agent, or Firm* — Lee, Hong, Degerman, Kang & Waimey PC

(57) ABSTRACT

Systems and methods for providing an output manifest are disclosed. According to at least one embodiment, a method of providing an output manifest representing a video channel includes: receiving, from a channel requester, a request for the output manifest; receiving input manifests including first and second input manifests; and creating the output manifest in response to receiving the request. Creating the output manifest includes: selecting at least one segment of the first input manifest, the at least one first input manifest segment bordered by a first marker; selecting at least one segment of the second input manifest, the at least one second input manifest segment bordered by a second marker common to the first marker; and creating the output manifest to include the at least one first input manifest segment followed by the at least one second input manifest segment. The output manifest is provided to the channel requester.

16 Claims, 9 Drawing Sheets

(51) Int. Cl.
 *H04N 21/647* (2011.01)
 *H04N 21/845* (2011.01)

(56) References Cited

U.S. PATENT DOCUMENTS

| | | |
|---|---|---|
| 2014/0156800 A1 | 6/2014 | Falvo |
| 2016/0073146 A1 | 3/2016 | Phillips et al. |
| 2017/0289597 A1 | 10/2017 | Riedel et al. |
| 2018/0176644 A1* | 6/2018 | Lopez ................ H04N 21/4394 |
| 2019/0132627 A1* | 5/2019 | Loheide ............. H04N 21/4583 |
| 2019/0146951 A1* | 5/2019 | Velmurugan ........... H04L 67/02 |
| | | 707/822 |

OTHER PUBLICATIONS

Md. Safiqul Islam, "A HTTP Streaming Video Server with Dynamic Advertisement Splicing", Master of Science Thesis, Royal Institute of Technology (KTH), School of Information and Communication Technology, Sweden, XP55173799, 2010, 108 pages.
European Patent Office Application Serial No. 20175937.0, Extended Search Report dated Aug. 5, 2020, 11 pages.

\* cited by examiner

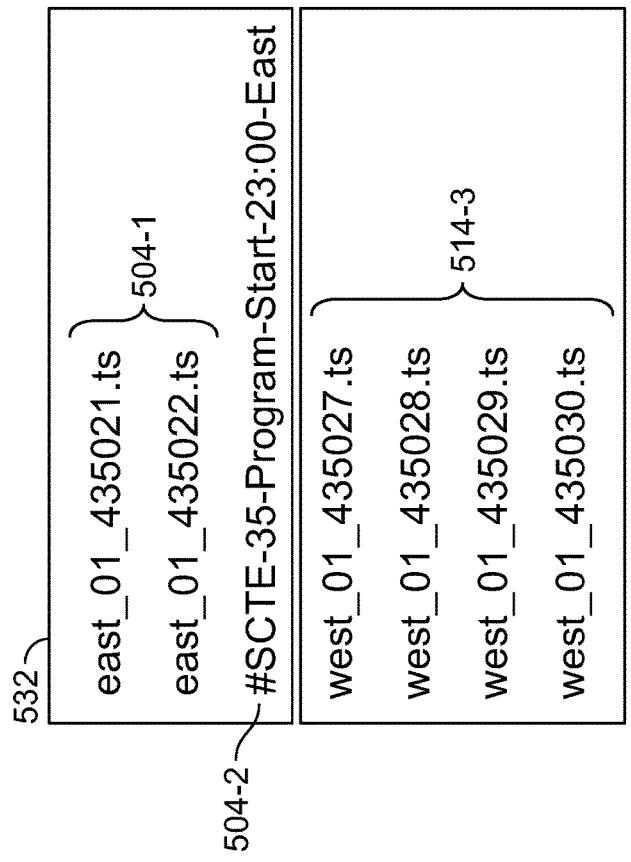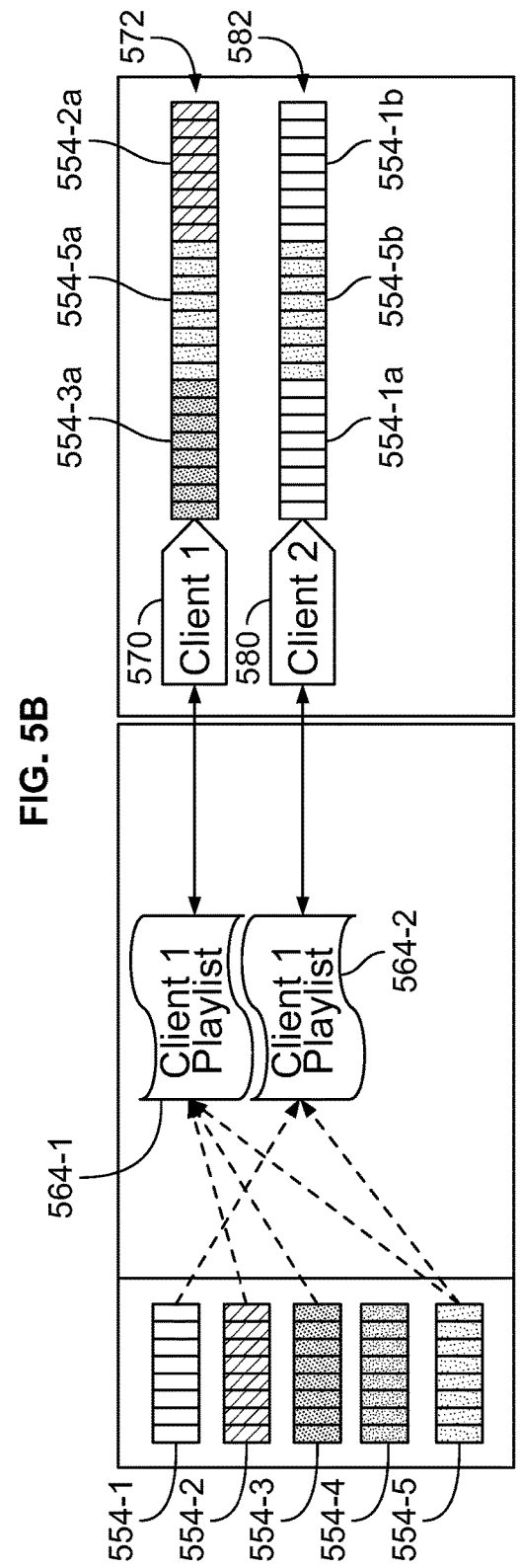

SYSTEM AND METHOD FOR PROVIDING A CUSTOMIZED MANIFEST REPRESENTING A VIDEO CHANNEL

BACKGROUND

In the broadcasting industry, a network affiliate is a local broadcaster that broadcasts programs, e.g., television programs of a television network. The network affiliate may also broadcast advertisements tailored to the local audience. Such examples of video content may be provided (or distributed) to the network affiliate for broadcast to members of the local audience.

Preparing and distributing a video channel to a network affiliate may involve decompressing video content that had been compressed to reduce bandwidth usage. After the video channel is prepared, it may be compressed prior to distribution. The decompression and subsequent compression of the video content may adversely affect video quality.

SUMMARY

According to at least one embodiment, a method of providing an output manifest representing a video channel includes: receiving, from a channel requester, a request for the output manifest; receiving a plurality of input manifests including a first input manifest and a second input manifest; and creating the output manifest in response to receiving the request. Creating the output manifest includes: selecting at least one segment of the first input manifest, the at least one first input manifest segment bordered by a first marker; selecting at least one segment of the second input manifest, the at least one second input manifest segment bordered by a second marker common to the first marker; and creating the output manifest to include the at least one first input manifest segment followed by the at least one second input manifest segment. The method also includes providing the output manifest to the channel requester.

According to at least one other embodiment, an apparatus for producing an output manifest representing a video channel includes a network communication unit configured to transmit and receive data; and one or more controllers. The one or more controllers are configured to: receive, from a channel requester, a request for the output manifest; receive a plurality of input manifests including a first input manifest and a second input manifest; and create the output manifest in response to receiving the request. The one or more controllers create the output manifest by: selecting at least one segment of the first input manifest, the at least one first input manifest segment bordered by a first marker; selecting at least one segment of the second input manifest, the at least one second input manifest segment bordered by a second marker common to the first marker; and creating the output manifest to include the at least one first input manifest segment followed by the at least one second input manifest segment. The one or more controllers are further configured to provide the output manifest to the channel requester.

According to at least one other embodiment, a machine-readable non-transitory medium having stored thereon machine-executable instructions for providing an output manifest representing a video channel is disclosed. The instructions include receiving, from a channel requester, a request for the output manifest; receiving a plurality of input manifests including a first input manifest and a second input manifest; and creating the output manifest in response to receiving the request. Creating the output manifest includes: selecting at least one segment of the first input manifest, the at least one first input manifest segment bordered by a first marker; selecting at least one segment of the second input manifest, the at least one second input manifest segment bordered by a second marker common to the first marker; and creating the output manifest to include the at least one first input manifest segment followed by the at least one second input manifest segment. The instructions further include providing the output manifest to the channel requester.

BRIEF DESCRIPTION OF THE DRAWINGS

The above and other aspects and features of the present disclosure will become more apparent upon consideration of the following description of embodiments, taken in conjunction with the accompanying drawing figures.

FIG. 5B illustrates an example of a portion of an output manifest according to at least one embodiment.

FIG. 5C illustrates examples of output manifests customized for two different affiliates according to at least one embodiment.

DETAILED DESCRIPTION

In the following detailed description, reference is made to the accompanying drawing figures which form a part hereof, and which show by way of illustration specific embodiments of the present invention. It is to be understood by those of ordinary skill in the technological field of channel customization and delivery that other embodiments may be utilized, and that structural, electrical, as well as procedural changes may be made without departing from the scope of the present invention. Wherever possible, the same reference numbers will be used throughout the drawings to refer to the same or similar parts.

Figure 1:
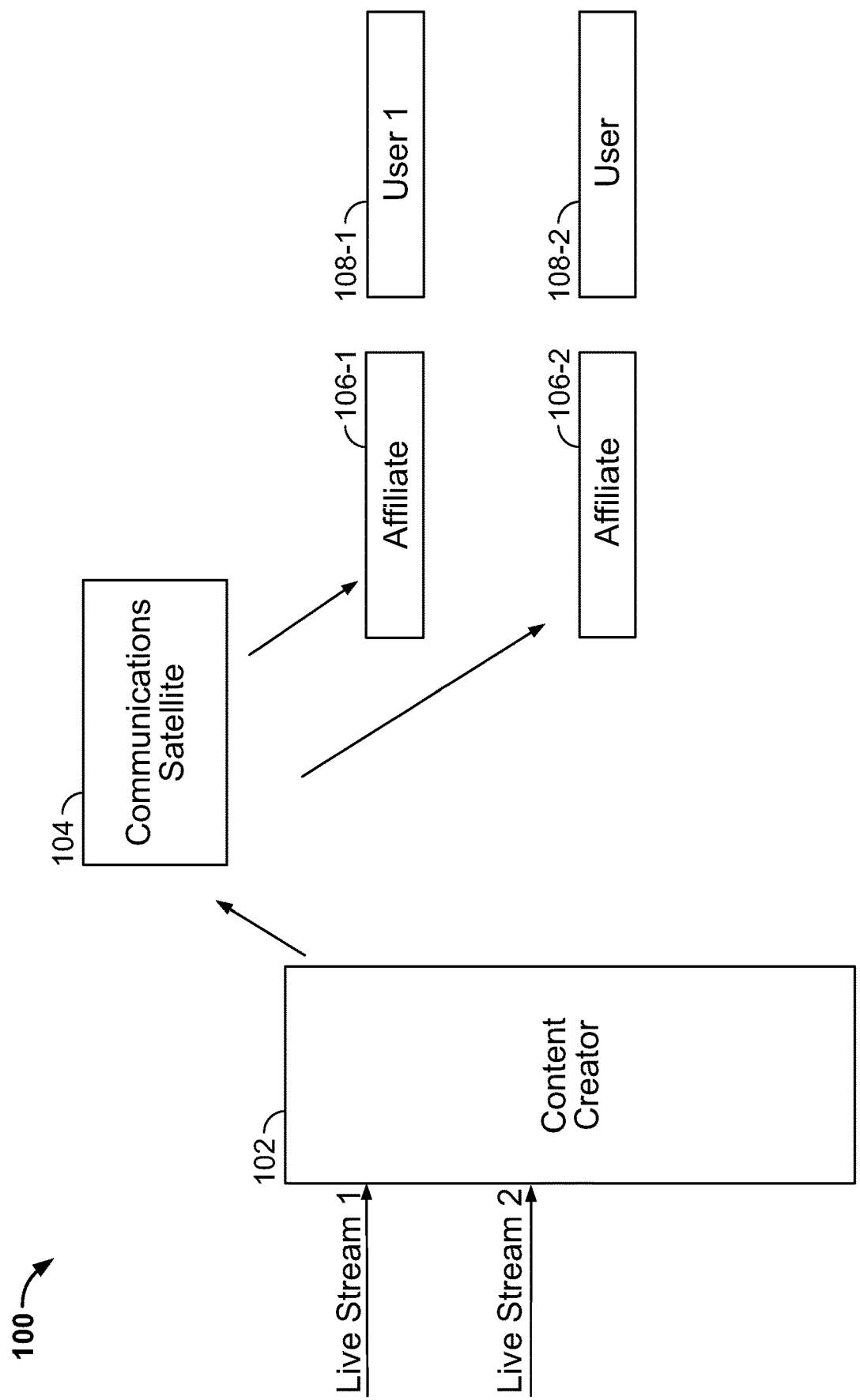
FIG. 1 is an illustration of a system for distributing video content to affiliate terminals.

As noted earlier, preparing and distributing a video channel to a network affiliate may involve decompression and subsequent compression of video content, which may adversely affect video quality, impose potentially expensive equipment requirements, and cause additional processing delay. For example, FIG. 1 is an illustration of a system 100 for distributing video content to affiliate terminals. Content creator 102 receives video content, which may be in the form of live video (e.g., Live Stream 1, Live Stream 2). The content creator 102 may process the received video by, e.g., compressing and/or encoding (e.g., encrypting) the video. The processed video is then sent to one or more network affiliates (e.g., affiliates 106-1 and 106-2) via a communications satellite 104. The network affiliates 106-1, 106-2 perform additional processing of the video before broadcasting the video to users 108-1, 108-2. For example, the network affiliate 106-1 may be required to decompress the received video before decoding (e.g., decrypt) the (decompressed) video and combining videos from other live streams or files to create a custom video channel. Additionally, the network affiliate 106-1 may be required to recompress the (decoded) video before broadcasting the custom video channel to users including the user 108-1.

One or more embodiments disclosed herein are directed to preparing and distributing a manifest representing a video channel to a network affiliate. According to one or more specific embodiments, the preparation of the manifest involves performing a manipulation (e.g., text manipulation) of input manifests (e.g., represented by text files or documents), and need not require performance of additional video processing (e.g., decompression, compression). In situations where the input manifests correspond to live sources (e.g., sources producing or generating live video), the prepared manifest facilitates switching, in an underlying video channel, from a first live source to a second live source, and vice versa, and from a first live source to a file, and vice versa.

Embodiments of the present invention relate to a system and method for providing a manifest (e.g., a customized manifest) that represents a video channel. In this disclosure, the content will be discussed primarily with respect to manifests generated for distribution via mobile and/or data transmission protocols. The term "distribution" will be used broadly to include various delivery methods of content, including air, cable, satellite, Internet, wireless, and other platforms known in the art, and shall not be limited to a particular technology or platform. One of ordinary skill in the art will appreciate that this disclosure is not to be limited to this list, or the following discussion, and is applicable to various other formats, medium, platforms, and distribution channels known to those skilled in the art.

Embodiments are directed to providing a manifest representing a video channel, e.g., to a network affiliate to facilitate a broadcast of the video channel by the network affiliate.

Figure 2:
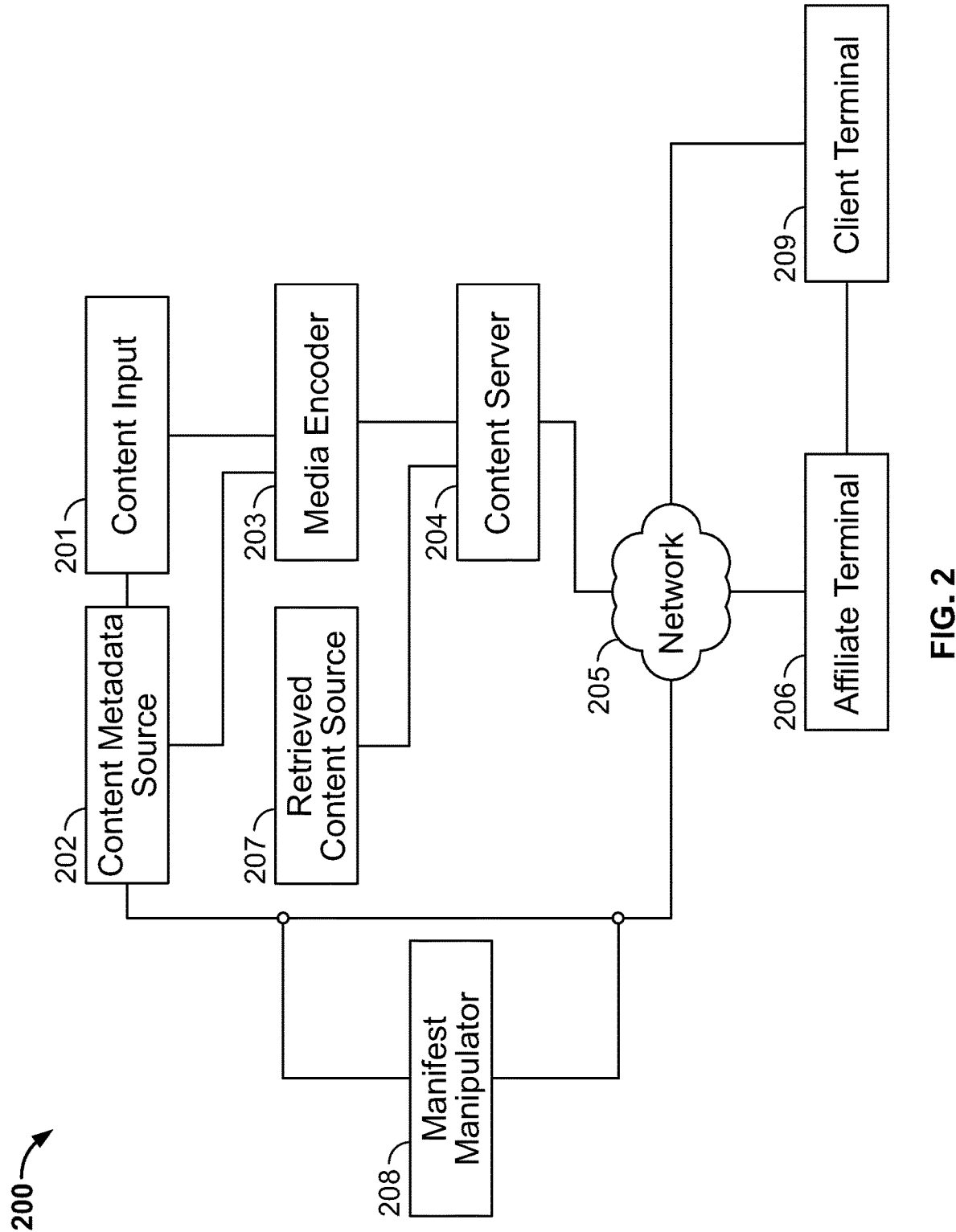
FIG. 2 is an illustration of a system for providing an output manifest according to at least one embodiment.

Referring to FIG. 2, a system 200 for providing a manifest is illustrated. The system 200 may be configured to generate, encode, distribute, and/or store audio and/or video content, as well as receive and handle requests from an affiliate terminal 206 for a manifest (e.g., a customized manifest) representing a video channel. The system 200 may also be configured to receive and handle requests from a client terminal 209 for presentation of the content. FIG. 2 will be discussed with respect to content that is suitable for delivery by streaming, etc. However, this disclosure is not to be limited thereto, and it will be understood by those of ordinary skill in the art that the features discussed herein are applicable to numerous other applications, platforms, and content delivery methods well known by those of ordinary skill in the art.

The system 200 may include a content input 201 in which content is created and/or generated for encoding and distribution. At the content input 201, a particular piece of content may be captured and/or uploaded. According to other embodiments of the system 200, the content may be otherwise provided from various sources including video (e.g., television broadcast, cable video distribution systems, satellite content distribution, Internet video, streaming video, mobile video distribution systems, digital video downloads, etc.). For purposes of brevity, examples of the content will be described with reference to FIG. 2, mostly with respect to non-advertisement content or advertisement content that is uploaded. However, it is understood that other types of content may be utilized. For example, although embodiments are described herein with reference to video content, it is understood that non-video or text-based content (such as interactive gaming, articles, ebooks, etc.) may be utilized.

The embodiment of the system 200 may further include a content metadata source 202, which creates, gathers, compiles, and/or provides metadata related to the content for compilation and incorporation with the distributed content. For example, the metadata may describe thematic elements, underlying subject matter, and other data.

In the system 200, the content metadata source 202 and the content input 201 may be coupled to a media encoder 203, which is configured to encode the content, along with encoded metadata of the content. The encoded files are then made available for streaming download (e.g., via an on-demand delivery system).

In some embodiments, the encoded files may correspond to commonly known compressed or uncompressed file formats including MPEG-1, MPEG-2, MPEG-4, H.264, AVC, DV, DVCAM, AVI, ASF, MOV, WMV, etc. However, it is understood that this disclosure is not limited thereto, and that numerous other compressions and formats may be utilized. The encoder may encode content and cause the generated encoded files to be distributed by a content server 204.

The media encoder 203 may also be configured to cause encoded media files to be concurrently stored in a memory associated with the content server 204. In some embodiments, the media encoder 203 may also be configured to provide the encoded media files to a retrieved content source 207 where it may be stored for retrieval. In other embodiments, the encoded media files may be stored in a database external to the system, and the content server 204 or the retrieved content source 207 may be configured to store pointers or path descriptions for querying and/or requesting the encoded media files from the external database for later retrieval.

According to at least one embodiment, the encoded media files may be stored in the retrieved content source 207 along with metadata associated with the media files, including encoding metadata, closed captioning information, etc. In some embodiments, the retrieved content source 207 may also receive metadata directly from content metadata source 202, for association and storage with the encoded media files.

Returning to the content server 204 of the system 200, the content server 204 may include a plurality of content servers, each configured to handle requests for media files and to facilitate transmission of media files to requesting parties. As illustrated in FIG. 2, the content server 204 may be in communication with a client terminal 209 via a network 205.

The content server 204 may be configured to receive requests from the client terminal 209 for media content and provide information to the client terminal 209 in response to the request. The information may include data associated with the encoded media content or address information for retrieving files of the encoded media content. It will be understood that content server 204 may be configured to provide information, data, and media content other than video, including audio, text, metadata, etc.

For example, content server 204 may be an enterprise server, a web server, a media server, a mobile data server, or any other type of server. In some embodiments, the content server 204 may be a computer or a computer program responsible for accepting requests (e.g., HTTP, RTSP, or other protocols that can initiate a media session) from client terminal 209 and serving client terminal 209 with streaming media. Although not shown in FIG. 2, embodiments are considered in which the client terminal 209 is configured to transmit and receive data directly to and from a separate web server, which in turn transmits and receives data transmissions to and from the content server 204 via a network such as the network 205.

The network 205 may include various systems for distribution of content including any desired combination of hardwired and wireless communication links, including wide area networks (WAN), local area networks (LAN), wireless networks suitable for packet-type communications, over-the-air, cable, Internet, other network connection systems, etc., which implement networks and hardware known and used in the related art, including broadcast technologies, cable or satellite distribution systems, Internet protocol (IP), or other networked technologies, etc. Examples of the content include live and recorded television, movies, Internet streaming video and audio, music, radio or other audio-visual content, and the like. The system 200 may also include a gateway (not depicted), for example, a server, a router, a firewall server, a host, a proxy server, request redirector, etc.

The client terminal 209 may be connected to the network 205. The client terminal 209 may be a hardware component including software code and applications that are configured to allow the client terminal to communicate, transmit, request, and receive data packets, which may correspond to streaming media data, via the network 205. The client terminal 209 may include any terminal or system configured to receive a content signal, and, in some embodiments, the client terminal 209 may be configured to decode received encoded media files and prepare the content for presentation to a user via an output device such as a display. The output device may be implemented in the same hardware as the client terminal 209, or, in some embodiments, the output device may be implemented in a separate hardware or location from the client terminal 209 and be otherwise coupled and/or associated with the client terminal, such as by wired connection or wireless communication (e.g., by wireless broadcast).

For example, the client terminal 209 may correspond to an Internet video streaming device, which is configured to request, transmit, and receive data packets corresponding to Internet streaming video, and the client terminal may be further configured to decode received data packets and prepare the media content to be displayed via a separate output, such as a television. In some embodiments, the client terminal 209 may also be configured to transmit information to one or more other aspects of the system 200 via the network 205, or similar network, regarding the content data received and decoded by the client terminal 209. Various other embodiments of the client terminal 209 may include televisions, desktop computers, laptop computers, tablet computers, mobile smartphones, personal media devices, wearable devices, set top box receivers, streaming Internet content devices, satellite television receivers, etc. In other embodiments, the client terminal 209 may be implemented in more than one connected device.

In an embodiment, the client terminal 209 may request, retrieve, and/or receive particular content from the content server 204 via the network 205. The request, retrieval, and/or the receiving of the particular content may correspond to a user of a client terminal selecting a particular piece(s) of content, entering a particular URL or address at the client terminal, or utilizing a content provider-specific application that is configured to connect to the content server 204 to transmit and receive instructions or requests for retrieval of specific content items. In some embodiments, the content server 204 may be configured to provide client terminal 209 with a single or multiple encoding streams of information, including audio/video content, as well as data associated with the audio/video content, such as metadata.

In one or more embodiments, the system 200 further includes a manifest manipulator 208. The manifest manipulator 208 may be configured to provide an affiliate terminal 206 with one or more manifest data files (or manifests) which include information relating to generation of a video channel. The manifest data file may be provided to the affiliate terminal 206 in response to a request for one or more manifests (e.g., customized manifests). The manifest may include information on a location where each encoding data file is available such as an address, link, or other pointer to a location where the encoding file can be retrieved. In one or more particular embodiments, the manifest may further include various metadata related to the encoded media content, such as event information, media type, aspect ratios, codec information, and the like. In some embodiments, the manifest may be provided in the form of an XML file. In some embodiments, the manifest may be provided in the form of an HTTP Live Streaming (HLS) file. However, various implementations and file types (such as other text files) may also be used.

In one or more embodiments, the affiliate terminal 206 is located at a network affiliate (or a network station). The affiliate terminal 206 may be configured to prepare content to be broadcast for viewing at devices such as the client terminal 209. In this regard, the term "terminal" may encompass a range of devices. For example, embodiments of the affiliate terminal 206 may include servers, desktop computers, laptop computers, tablet computers, streaming Internet content devices, satellite television receivers, at least one integrated receiver/decoder (IRD), etc. In other embodiments, the affiliate terminal 209 may be implemented in more than one connected device.

Figure 3:
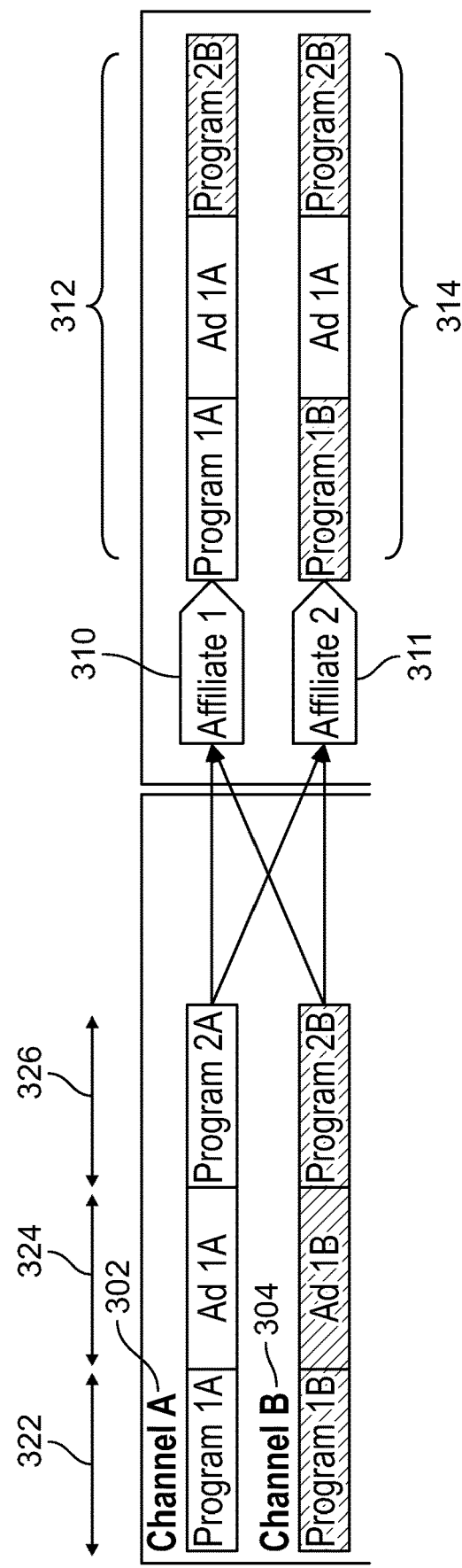
FIG. 3 illustrates an example of channels that are distributed to affiliate terminals.

FIG. 3 illustrates an example of channels that are distributed to affiliate terminals such as affiliate terminal 206 of FIG. 2 based on the scheme as described with respect to FIG. 1. In the example of FIG. 3, two channels 302 and 304 are distributed. Both channels 302 and 304 are distributed to each of multiple affiliate terminals (e.g., affiliate terminal 310 and affiliate terminal 311). As such, the affiliate terminal 310 receives both channel 302 and channel 304. In addition, the affiliate terminal 311 receives both channel 302 and channel 304.

Channel 302 includes segments of content corresponding to particular time periods. For example—as illustrated in FIG. 3, corresponding to a first time period (time period 322), the channel 302 includes particular program content (Program 1A). A second time period (time period 324) follows time period 322, and precedes a third time period (time period 326). Corresponding to the time period 324, the channel 302 includes advertisement content (Ad 1A). Corresponding to the time period 326, the channel 302 includes particular program content (Program 2A).

Similarly, the channel 304 includes segments of content corresponding to particular time periods. For example—as illustrated in FIG. 3, corresponding to the time period 322, the channel 304 includes particular program content (Program 1B). Corresponding to the time period 324, the channel 304 includes advertisement content (Ad 1B). Corresponding to the time period 326, the channel 304 includes particular program content (Program 2B).

For purposes of preparing a video channel for broadcast, each affiliate terminal may select content from a particular channel (e.g., channel 302 or channel 304) for a particular time period (e.g., time period 322, time period 324, or time period 326). Accordingly, in the example of FIG. 3, in which two channels 302 and 304 are distributed—each affiliate terminal can effectively switch between selecting content of the first channel 302 and selecting content of the second channel 304 for broadcast.

For example, selections performed by the affiliate terminal 310 will now be described with reference to FIG. 3. For the time periods 322 and 324, the affiliate terminal 310 selects content of the first channel 302 for broadcast. For the time period 326, the affiliate terminal 310 selects content of the second channel 304 for broadcast. As such, during broadcast of a resulting channel 312, a viewer of the channel would view the Program 1A and the Ad 1A during the time period 322 and the time period 324, respectively. During the time period 326, the viewer would view the Program 2B.

Selections performed by the affiliate terminal 311 will now be described also with reference to FIG. 3. For the time period 322, the affiliate terminal 311 selects content of the second channel 304 for broadcast. For the time period 324, the affiliate terminal 311 selects content of the first channel 302 for broadcast. For the time period 326, the affiliate terminal 311 selects content of the second channel 304 for broadcast. As such, during broadcast of a resulting channel 314, a viewer of the channel would view the Program 1B during the time period 322, the Ad 1A during the time period 324, and the Program 2B during the time period 326.

As noted earlier, the example of FIG. 3 enables each affiliate terminal to effectively switch between selecting content of the first channel 302 and selecting content of the second channel 304 for broadcast. However, the times at which such switching is permitted are based on the start and end times of the time periods (e.g., time period 322, time period 324, and time period 326) according to which the channels 302 and 304 are programmed. It is possible that the start and end times of such time periods may not accurately reflect the length of a particular piece of content. For example, if the actual duration of the Program 1A exceeds the duration of the time period 322, then the beginning and/or the end of Program 1A would be "clipped" during broadcast of the channel 312. For example, a viewer watching the channel 312 would not be able to view the beginning and/or the end of Program 1A.

As will be described in more detail below, various embodiments of this disclosure are directed to addressing such limitations that are imposed by the programming methodology described with reference to FIG. 3.

Embodiments of the present disclosure are directed to providing a customized manifest representing a video channel to a recipient. For example, the recipient may be a local broadcast network affiliate. The customized manifest may represent a combination of live video feeds (e.g., time-zone based live feeds) and/or advertisements that are local to the area served by the broadcast network affiliate. The affiliate is not required to switch between predefined channels (e.g., channels 302 and 304 of FIG. 3). Rather—based on the customized manifest, the affiliate may directly consume (e.g., play out) a video channel that is customized to one or more preferences (e.g., scheduling preferences) of the affiliate. According to various embodiments, the customized manifest is provided without reducing, or otherwise adversely affecting, video quality.

Figure 4:
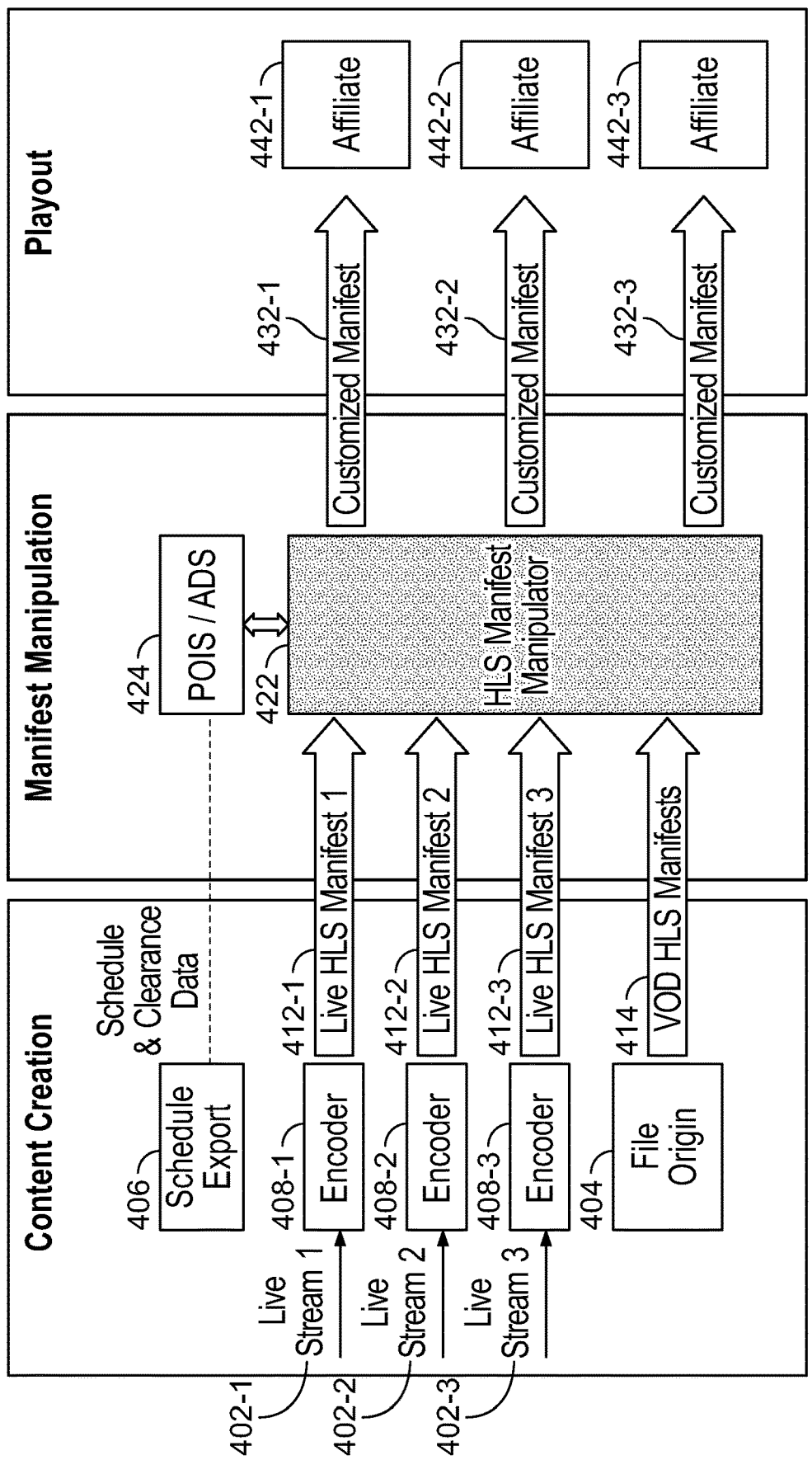
FIG. 4 is a block diagram illustrating providing of customized manifests according to at least one embodiment.

FIG. 4 is a block diagram illustrating providing customized manifests according to at least one embodiment. Each customized manifest may represent a video channel that includes video content originating from one or more of multiple sources. The sources may include sources 402-1, 402-2 and 402-3, which provide live streams of video content. One or more of the live streams may correspond to the particular time zone in which a recipient affiliate is based. The source 402-1 produces a live stream that is input to an encoder 408-1, which encodes the live stream to produce encoded video. Similarly, the source 402-2 produces a live stream that is input to an encoder 408-2, which encodes the live stream to produce encoded video. Also, the source 402-3 produces a live stream that is input to an encoder 408-3, which encodes the live stream to produce encoded video.

The sources may also include sources that provide prerecorded video content. For example, the sources may include source 404, which provides video that is prerecorded. For example, the prerecorded video may include prerecorded programs, movies, and/or advertisements (e.g., advertisements that are local to an area served by the broadcast network affiliate). The content provided by the source 404 may be in encoded form.

Each of the encoders 408-1, 408-2, 408-3 and the source 404 provides video content in the form of manifests (or playlists). For example, the encoders 408-1, 408-2 and 408-3 provide live video manifests 412-1, 412-2 and 412-3, respectively. Also, the source 404 provides a video-on-demand manifest 414.

As described earlier with reference to FIG. 2, a manifest may include a location where each encoding data file is available, such as an address, link, or other pointer to a location where the encoding file can be retrieved. According to various embodiments, each manifest may be an HTTP Live Streaming (HLS) file. HLS is an HTTP-based adaptive bitrate streaming communications protocol. Based on standard HTTP transactions, HLS allows content to be offered from conventional HTTP servers and to be delivered over HTTP-based content delivery networks. HLS involves segmenting an overall stream into a sequence of smaller HTTP-based file download segments, each download segment loading a short (or shorter) video that is, e.g., 1 to 10 seconds in length. The download segments are listed in a manifest, examples of which will be described in more detail later with reference to FIG. 5A.

To facilitate preparation of customized video channels, schedule export 406 provides schedule and clearance data. The schedule and clearance data capture programming preferences (e.g., scheduling preferences) of one or more network affiliates. For example—for each network affiliate, the schedule and clearance data may indicate the content (e.g., the particular program) that is to be broadcast at a particular time (or times). Also, the schedule and clearance data may include location information (e.g., time zone information) for each network affiliate. As a further example, the schedule and clearance data may include blackout restriction information—e.g., information indicating that particular network affiliates (or broadcast markets) are forbidden to broadcast (or otherwise restricted with regards to broadcasting) particular content. In this situation, the schedule and clearance data may identify alternative content that may be broadcast in lieu of the forbidden (or restricted) content. Conversely, the schedule and clearance data may include information indicating that particular network affiliates (or broadcast markets) are cleared (or otherwise permitted) to broadcast particular content, e.g., at a particular time(s).

As illustrated in FIG. 4, the manifests 412-1, 412-2, 412-3 and 314 are input to an HLS manifest manipulator 422. The schedule and clearance data provided by the schedule export 406 is input to a placement opportunity information service (POIS)/ad decision service (ADS) 424.

The POIS 424 is a system or process that identifies and provides descriptions of placement opportunities for media (such as the availability to insert ads). The POIS 424 may contain requirements and attributes that can include which platforms may be used, ownership rights, and policies that are used to coordinate the placement of media.

Based on the schedule and clearance data, the HLS manifest manipulator 422 creates customized manifests for each of broadcast network affiliates 442-1, 442-2 and 442-3. For example, the HLS manifest manipulator 422 may receive a request from the network affiliate 442-1. The request is for a customized manifest, and may include an identifier (e.g., a network call sign or a network affiliate identifier) that uniquely identifies the network affiliate 442-1 as the requester. In response to receiving the request, the HLS manifest manipulator 422 creates the customized manifest, e.g., based on the schedule and clearance data. For example, the HLS manifest manipulator 422 provides the unique identifier to the POIS/ADS 424 in order to request the schedule and clearance data. By way of example, the unique identifier is communicated to the POIS/ADS 424 so that the POIS/ADS 424 can use the unique identifier in combination with the schedule and clearance data to make a decision as to what content, if any, the network affiliate 442-1 should be viewing in its manifest, and subsequently reply to the HLS manifest manipulator 422 with the identification of the content to include in the manifest for the network affiliate 442-1. For example, the HLS manifest manipulator 422 may use the schedule and clearance data to determine the programming preferences (e.g., scheduling preferences) of the network affiliate 442-1. As another example, the HLS manifest manipulator 422 may use the schedule and clearance data to determine if the network affiliate is forbidden to broadcast particular content. As a general matter, the customized manifest that is created by the HLS manifest manipulator 422 conforms and/or complies with preferences and/or restrictions that are captured in the schedule and clearance data.

Each customized manifest may refer to video content originating from one or more of the sources 402-1, 402-2, 402-3 and 404. Accordingly, each customized manifest is generated based on one or more of the manifests 412-1, 412-2, 412-3 and 314. As illustrated in FIG. 4, the HLS manifest manipulator 422 provides customized manifests 432-1, 432-2 and 432-3 to the broadcast network affiliates 442-1, 442-2 and 442-3, respectively. At each of the affiliates, the customized manifest may be directly consumed (e.g., by an off-the-shelf HLS player), or converted from HLS format into a linear stream to support more traditional downstream systems.

For example, the network affiliate 442-1 may receive the customized manifest 432-1. As described earlier with respect to manifests, the customized manifest 432-1 may include information on a location where a particular video file is available such as an address, link, or other pointer to a location where the video file can be retrieved. Using such information, the network affiliate 442-1 requests the underlying video files (e.g., from one or more locations such as one or more of the content servers 204 of FIG. 2, or one or more of the retrieved content sources 207 of FIG. 2). Upon receiving the underlying video files, the network affiliate 442-1 may prepare a video channel, e.g., by assembling the underlying video files. The network affiliate may then broadcast the prepared video channel to users in the corresponding broadcast area. The broadcast may be displayed at one or more devices such as client terminal 209 of FIG. 2. As such, an underlying video channel exists virtually in the customized manifest 432-1, and is realized when the network affiliate 442-1 uses the manifest 432-1 to retrieve the underlying video files, and, if necessary, then decodes the retrieved video files.

As will be described in more detail later with reference to the example manifest of FIG. 5B, the HLS manifest manipulator 422 produces a customized manifest without being required to decode any encoded video. Rather, the creation of the customized manifest involves manipulating (e.g., modifying) the text files that are the input manifests (e.g., manifests 412-1, 412-2, 412-3 and 314). As such, the creation of the customized manifests need not be computationally intensive. Further, the creation of the customized manifests need not introduce losses in video quality (e.g., losses associated with decoding and/or re-encoding video content).

Figure 5A:
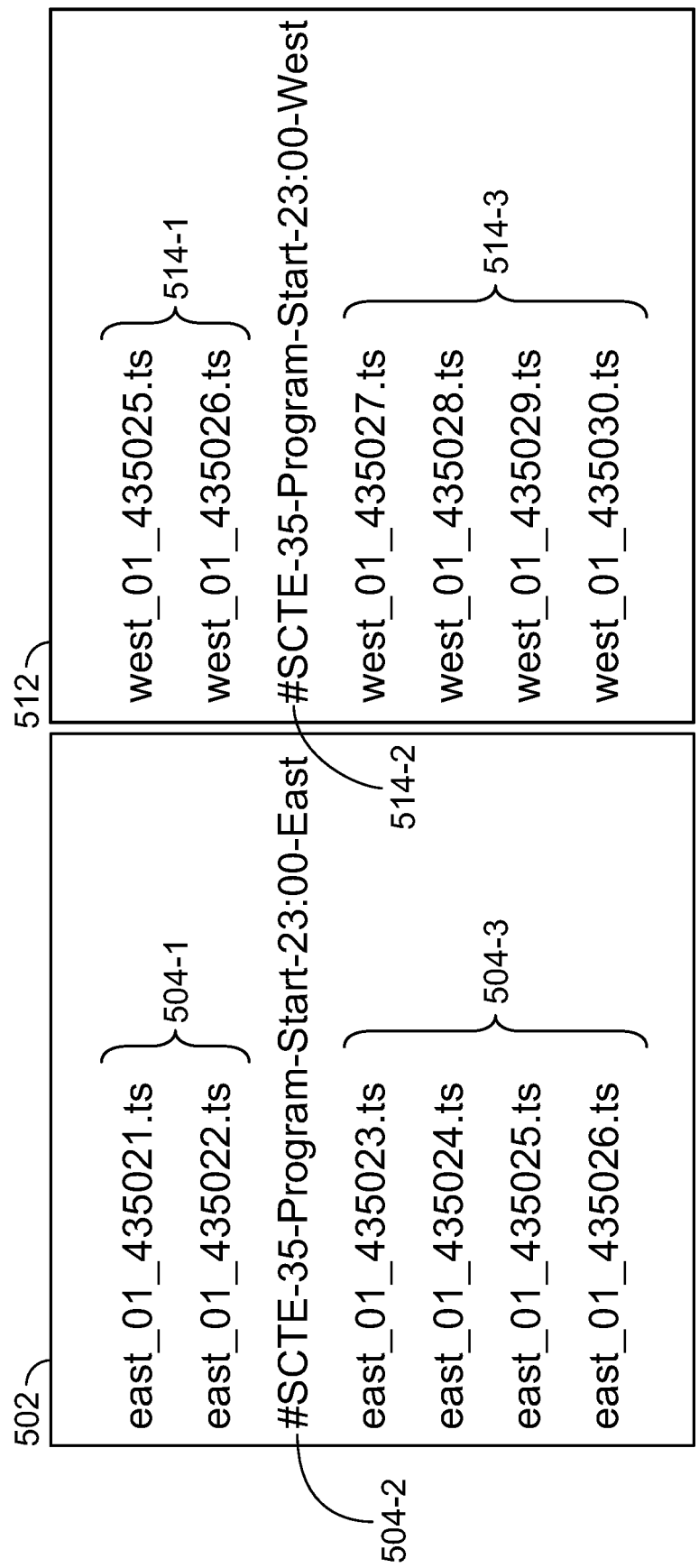
FIG. 5A illustrates portions of example input manifests.

FIG. 5A illustrates portions of example input manifests 502 and 512. The input manifests 502 and 512 may be live manifests, in that the input manifests 502 and 512 are manifests corresponding to a respective live stream intended for eastern region and a western region, respectively. By way of example, the input manifests 502 and 512 may be similar, respectively, to the live manifests 412-1 and 412-2 of FIG. 4.

The input manifest 502 may list respective locations (or references thereto) where multiple segments are available. For example, the input manifest 502 may list locations for HLS video segments. In the input manifest 502, at least one segment is listed in each portion of the manifest (e.g., portions 504-1 and 504-2). With reference to FIG. 5A, two segments are listed in the portion 504-1: "east_01_435021.ts" and "east_01_435022.ts." Also, four segments are listed in the portion 504-3: "east_01_435023.ts," "east_01_435024.ts," "east_01_435025.ts" and "east_01_435026.ts."

The portions 504-1 and 504-3 of the input manifest 502 are separated by a marker 504-2. As illustrated in FIG. 5A, a segment included in the portion 504-1 (i.e., "east_01_435022.ts") is immediately followed by the marker 504-2. The marker 504-2 is for segmenting the underlying video stream into segments at a particular splice point. The splice point is chosen to indicate (or signal) an advantageous opportunity to switch the underlying video stream, e.g., for purposes such as the insertion of an advertisement. Alternatively (or in addition), the marker 504-2 may indicate occurrence of an end of a first broadcast program (or of a first chapter of a broadcast program) and/or of a beginning of a second broadcast program (or of a second chapter of the same broadcast program). For example, if the input manifest 502 is a manifest corresponding to prerecorded video, then the marker 504-2 may be used to designate a boundary between chapters (or sections) of a same broadcast program. As such, the marker 504-2 indicates an advantageous opportunity for performing a switching in the underlying video stream, e.g., from a particular video source to a different video source.

For example, the marker 504-2 may include an SCTE-35 marker. In order to align two or more live video streams (e.g., video streams produced by sources 402-1, 402-2, 402-3 of FIG. 4), upstream encoders insert SCTE-35 markers into the live HLS manifests at splice points common to all of the live video streams. The splice points at which the SCTE-35 markers are inserted indicate appropriate (or suitable) points for inserting an advertisement, or otherwise performing a switching in an underlying (or generated) video stream.

Similar to the input manifest 502, the input manifest 512 may list respective locations (or references thereto) where multiple segments are available. For example, the input manifest 512 may list locations for HLS video segments. In the input manifest 512, at least one segment is listed in each portion of the manifest (e.g., portions 514-1 and 514-2). With reference to FIG. 5A, two segments are listed in the portion 514-1: "west_01_435025.ts" and "west_01_435026.ts." Also, four segments are listed in the portion 514-3: "west_01_435027.ts," "west_01_435028.ts," "west_01_435029.ts" and "west_01_435030.ts."

The portions 514-1 and 514-3 of the input manifest 512 are separated by a marker 514-2. As illustrated in FIG. 5A, a segment included in the portion 514-3 (i.e., "west_01_435027.ts") is immediately preceded by the marker 514-2. The marker 514-2 is for segmenting the underlying video stream into segments at a particular splice point. The splice point is chosen to signal an advantageous opportunity for segmenting the underlying video stream, e.g., for purposes such as the insertion of an advertisement.

Similar to the marker 504-2, the marker 514-2 may include an SCTE-35 marker. In particular, when the input manifests 502 and 512 are live manifests, the SCTE-35 marker of the marker 514-2 may be common to the SCTE-35 marker of the marker 504-2. For example, in the case of switching between live streams, the two SCTE-35 markers may be common to each other, in that the two SCTE-35 markers are aligned with respect to time. By way of example, the two SCTE-35 markers may both be aligned to a same time in a particular time zone—e.g., 17:19:06 EST (Eastern Standard Time).

FIG. 5B illustrates a portion of an output manifest 532. The output manifest 532 is an example of a customized manifest that is produced, e.g., by the HLS manifest manipulator 422 of FIG. 4.

When a client (e.g., broadcast network affiliate 442-1, 442-2 or 442-3 of FIG. 4) requests a video channel, the HLS manifest manipulator 422 retrieves one or more scheduling preferences of the client (e.g., via POIS 424) and dynamically creates a customized channel by selecting segments from multiple input manifests and including (e.g., compiling) the selected segments in an output manifest.

For example, when producing a customized channel involves switching from selecting content from a particular input manifest (e.g., input manifest 502) to selecting content from another input manifest (e.g., input manifest 512), the HLS manifest manipulator 422 selects at least one segment from the particular input manifest and at least one segment from the other input manifest. The selected segments are included in a customized manifest produced by the HLS manifest manipulator 422.

The segments selected from the input manifests may be selected based on the segments being bordered by markers that are common to each other. For example, with reference back to FIG. 5A, the HLS manifest manipulator 422 may select the portion 504-1 of the input manifest 502 and the portion 514-3 of the input manifest 512 based on these portions including segments (e.g., "east_01_435022.ts" and "west_01_435027.ts") being bordered by markers 504-2 and 514-2 that are common to each other (for switching between live streams, markers are common to each other when they are aligned in time).

As illustrated in FIG. 5B, the output manifest 532 includes the portion 504-1 of the input manifest 502, followed by the portion 514-3 of the input manifest 512. In the output manifest 532, the portion 504-1 and the portion 514-3 may be separated by the marker 504-2. Alternatively, the portion 504-1 and the portion 514-3 may be separated by the marker 514-2.

According to embodiments that have been described, a switch from one live stream to another live stream is performed at points that were aligned by SCTE-35 markers. Because portions of different manifests are combined at points where SCTE-35 markers had been inserted, the underlying video streams may be combined without significant "jumps" during playback of the customized channel represented by the output manifest. As a result of a buffer built into HLS, this may be achieved even if the input sources are not perfectly synchronized due to differences in encoder delay or network speed.

FIG. 5C illustrates examples of output manifests customized for two different affiliate clients according to at least one embodiment. Output manifest 564-1 is produced for an affiliate client (e.g., network affiliate) 570. Output manifest 564-2 is produced for an affiliate client 580. The output manifests are customized using content from one or more of sources 554-1, 554-2, 554-3, 554-4 and 554-5. It is understood that the output manifests 564-1 and 564-2 may be produced by a system such as the HLS manifest manipulator 422 of FIG. 4.

Similar to the example described earlier with reference to FIGS. 5A and 5B, the output manifest 564-2 may list content from a total of two different sources. As illustrated in FIG. 5C, the output manifest 564-2 corresponds to a customized video channel 582. The output manifest 564-2 lists content from the source 554-1 (see, e.g., portions 554-1a and 554-1b) and content from the source 554-5 (see, e.g., portion 554-5b). It is understood that the neighboring portions 554-1a and 554-5b are combined in the output manifest 564-2 in a manner similar to the manner described earlier with reference to the portions 504-1 and 514-3 of FIGS. 5A and 5B. Also, the neighboring portions 554-5b and 554-1b are combined in the output manifest 564-2 in a manner similar to that described earlier with reference to the portions 504-1 and 514-3 of FIGS. 5A and 5B.

It is understood that the total number of sources used in producing an output manifest is not limited to two (or any other particular number). For example, as illustrated in FIG. 5C, the output manifest 564-1 may list content from a total of three different sources. The output manifest 564-1 corresponds to a customized video channel 572. The output manifest 564-1 lists content from the source 554-3 (see, e.g., portion 554-3a), content from the source 554-5 (see, e.g., portion 554-5a) and content from the source 554-2 (see, e.g., portion 554-2a). It is understood that the neighboring portions 554-3a and 554-5a are combined in the output manifest 564-1 in a manner similar to the manner described earlier with reference to the portions 504-1 and 514-3 of FIGS. 5A and 5B. Also, the neighboring portions 554-5a and 554-2a are combined in the output manifest 564-2 in a manner similar to that described earlier with reference to the portions 504-1 and 514-3 of FIGS. 5A and 5B.

According to one or more embodiments, the sources 554-1, 554-2, 554-3, 554-4 and 554-5 provide live video segments. However, it is understood that one or more of these sources provide prerecorded video. As such, a resulting customized channel (e.g., channel 572, 582) may include live video and/or prerecorded video. For example, the customized channel may include a switch from a live video source to a prerecorded video source. The switch may occur to lead from a SCTE-35 marker in a live manifest for the live video source, to a SCTE-35 marker in a manifest for the prerecorded video source.

Figure 6:
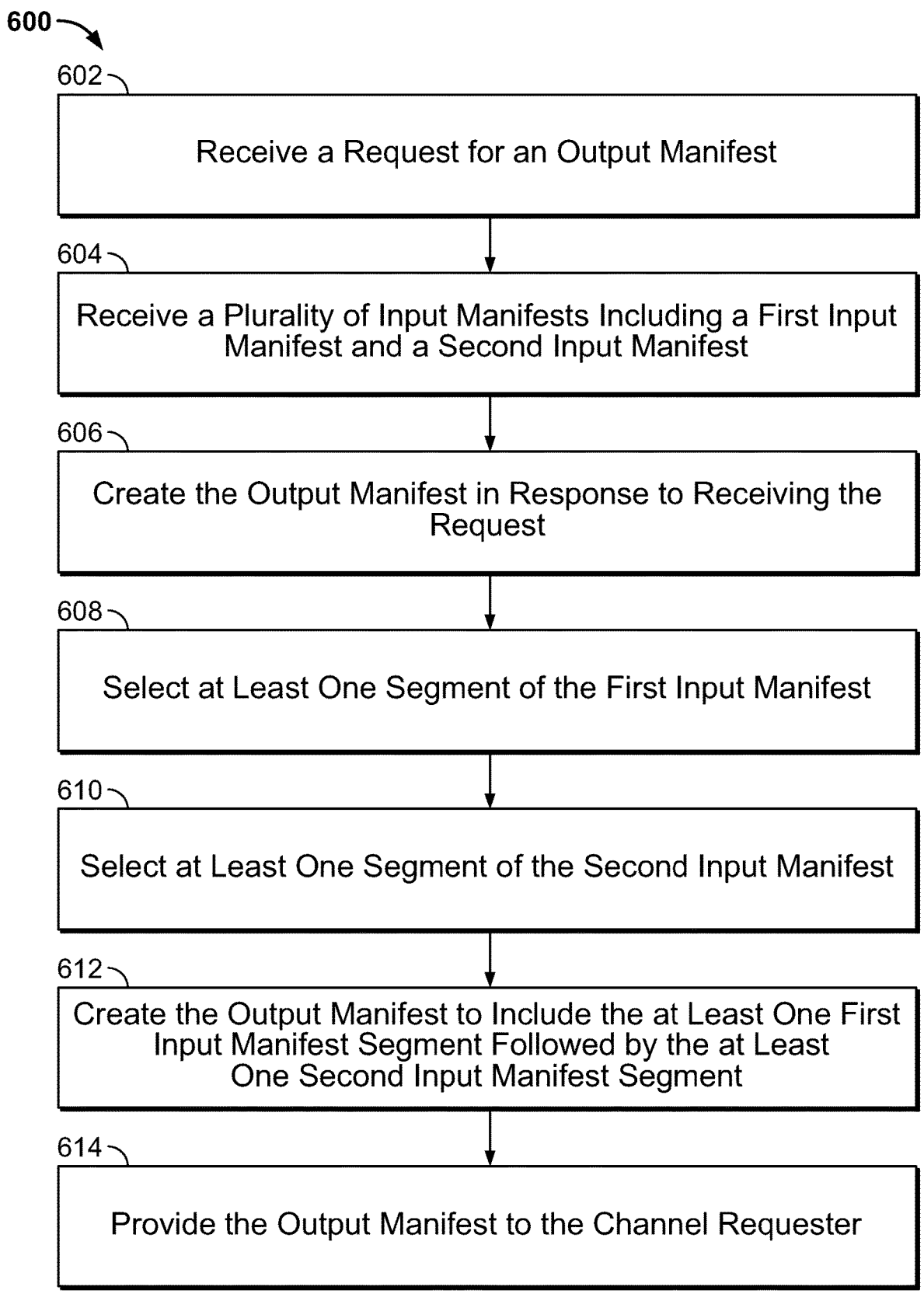
FIG. 6 is a flowchart illustrating a method of providing an output manifest representing a video channel according to at least one embodiment.

FIG. 6 illustrates a flowchart of a method 600 of providing an output manifest representing a video channel according to at least one embodiment.

At block 602, a request for an output manifest is received. For example, with reference back to FIG. 4, the HLS manifest manipulator 422 receives a request from one of the network affiliates 442-1, 442-2, 442-3.

At block 604, a plurality of input manifests are received. The input manifests include a first input manifest and a second input manifest. For example, with reference back to FIGS. 4 and 5A, the HLS manifest manipulator 422 receives input manifests 502 and 512.

At block 606, the output manifest is created in response to receiving the request. With reference to block 608, creating the output manifest includes selecting at least one segment of the first input manifest, the at least one first input manifest segment bordered by a first marker. For example, with reference back to FIG. 5A, the portion 504-1 of the input manifest 502 is selected. The portion 504-1 (which includes the segment "east_01_435022.ts") is bordered by the marker 504-2.

With reference to block 610, creating the output manifest further includes selecting at least one segment of the second input manifest, the at least one second input manifest segment bordered by a second marker common to the first marker. For example, also with reference back to FIG. 5A, the portion 514-3 of the input manifest 512 is selected. The portion 514-3 (which includes the segment "west_01_435027.ts) is bordered by the marker 514-2. The marker 514-2 is common to the marker 504-2.

With reference to block 612, creating the output manifest further includes creating the output manifest to include the at least one first input manifest segment followed by the at least one second input manifest segment. For example, with reference back to FIG. 5B, the output manifest 532 includes the portion 504-1 (of the input manifest 502) followed by the portion 514-3 (of the input manifest 512).

According to one or more particular embodiments, the first input manifest segment and the second input manifest segment are separated by either the first marker or the second marker. For example, also with reference back to FIG. 5B, in the output manifest 532, the portion 504-1 and the portion 514-3 are separated by the marker 504-2.

At block 614, the output manifest is provided to the channel requester. For example, with reference to FIGS. 4 and 5B, an output manifest 532 is provided to one of the network affiliates 442-1, 442-2, 442-3.

As previously described, in at least some embodiments, the client terminal, the encoder, the content server, the web servers, or other aspects of the described system (e.g., system 200 of FIG. 2, the HLS manifest manipulator 422 of FIG. 4) may include one or more software or hardware computer systems and may further include (or may be operably coupled to) one or more hardware memory systems for storing information including databases for storing, accessing, and querying various content, encoded data, shared addresses, metadata, etc. In hardware implementations, the one or more computer systems incorporate one or more computer processors and controllers.

The components of various embodiments described herein may each include a hardware processor of the one or more computer systems, and, in one embodiment, a single processor may be configured to implement the various components. For example, in one embodiment, the encoder, the content server, and the web server, or combinations thereof, may be implemented as separate hardware systems, or may be implemented as a single hardware system. The hardware system may include various transitory and non-transitory memory for storing information, wired and wireless communication receivers and transmitters, displays, and input and output interfaces and devices. The various computer systems, memory, and components of the system may be operably coupled to communicate information, and the system may further include various hardware and software communication modules, interfaces, and circuitry to enable wired or wireless communication of information.

Figure 7:
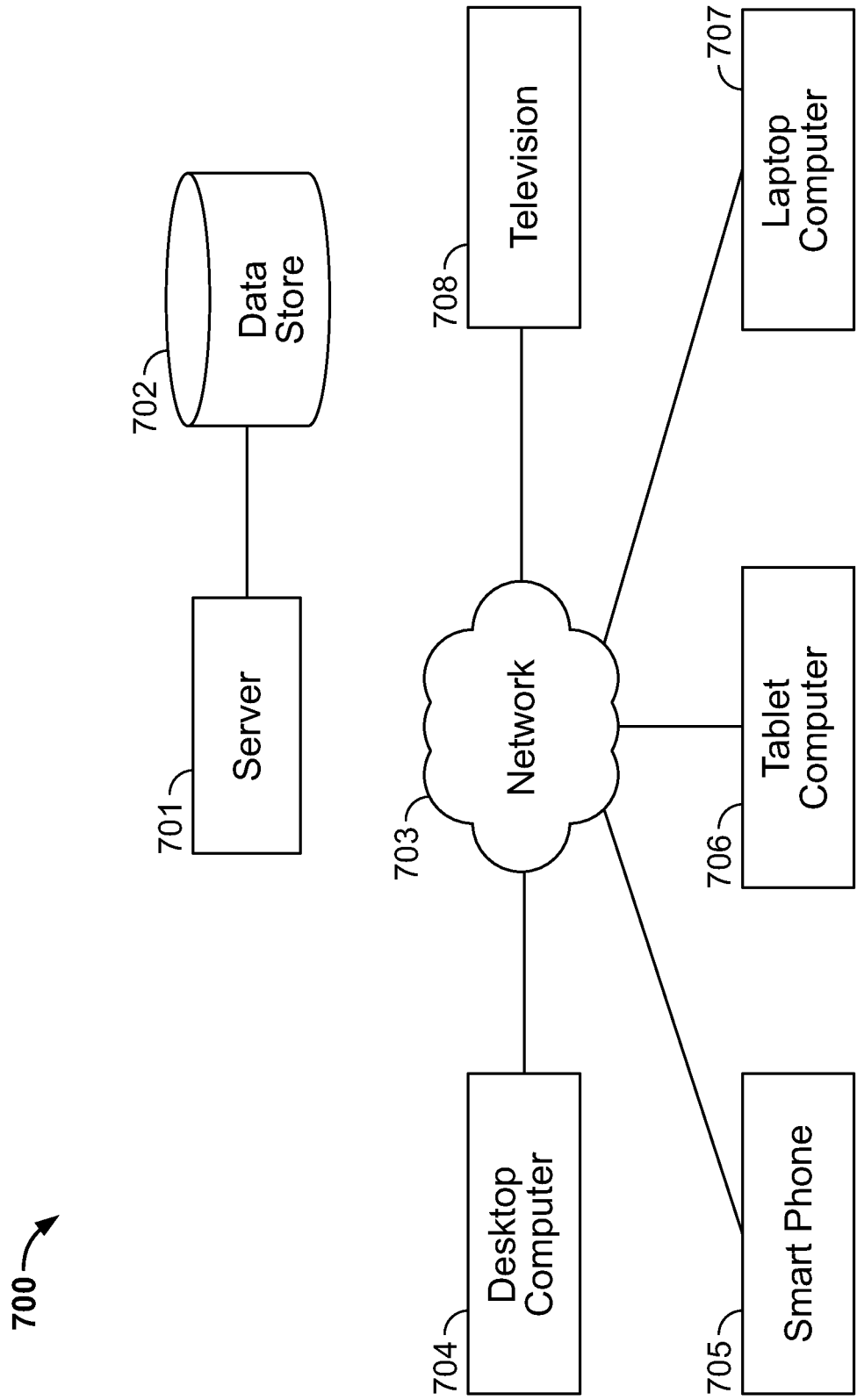
FIG. 7 is an illustration of a computing environment according to at least one embodiment.

In selected embodiments, features and aspects described herein may be implemented within a computing environment 700, as shown in FIG. 7, which may include one or more computer servers 701. The server 701 may be operatively coupled to one or more data stores 702 (e.g., databases, indexes, files, or other data structures). The server 701 may connect to a data communication network 703 including a local area network (LAN), a wide area network (WAN) (e.g., the Internet), a telephone network, a satellite or wireless communication network, or some combination of these or similar networks.

One or more client devices 704, 705, 706, 707, 708 may be in communication with the server 701, and a corresponding data store 702 via the data communication network 703. Such client devices 704, 705, 706, 707, 708 may include, for example, one or more laptop computers 707, desktop computers 704, smartphones and mobile phones 705, tablet computers 706, televisions 708, or combinations thereof. In operation, such client devices 704, 705, 706, 707, 708 may send and receive data or instructions to or from the server 701 in response to user input received from user input devices or other input. In response, the server 701 may serve data from the data store 702, alter data within the data store 702, add data to the data store 702, or the like, or combinations thereof.

In selected embodiments, the server 701 may transmit one or more media files including audio and/or video content, encoded data, generated data, and/or metadata from the data store 702 to one or more of the client devices 704, 705, 706, 707, 708 via the data communication network 703. The devices may output the audio and/or video content from the media file using a display screen, projector, or other display output device. In certain embodiments, the system 700 configured in accordance with features and aspects described herein may be configured to operate within or support a cloud computing environment. For example, a portion of, or all of, the data store 702 and server 701 may reside in a cloud server.

Figure 8:
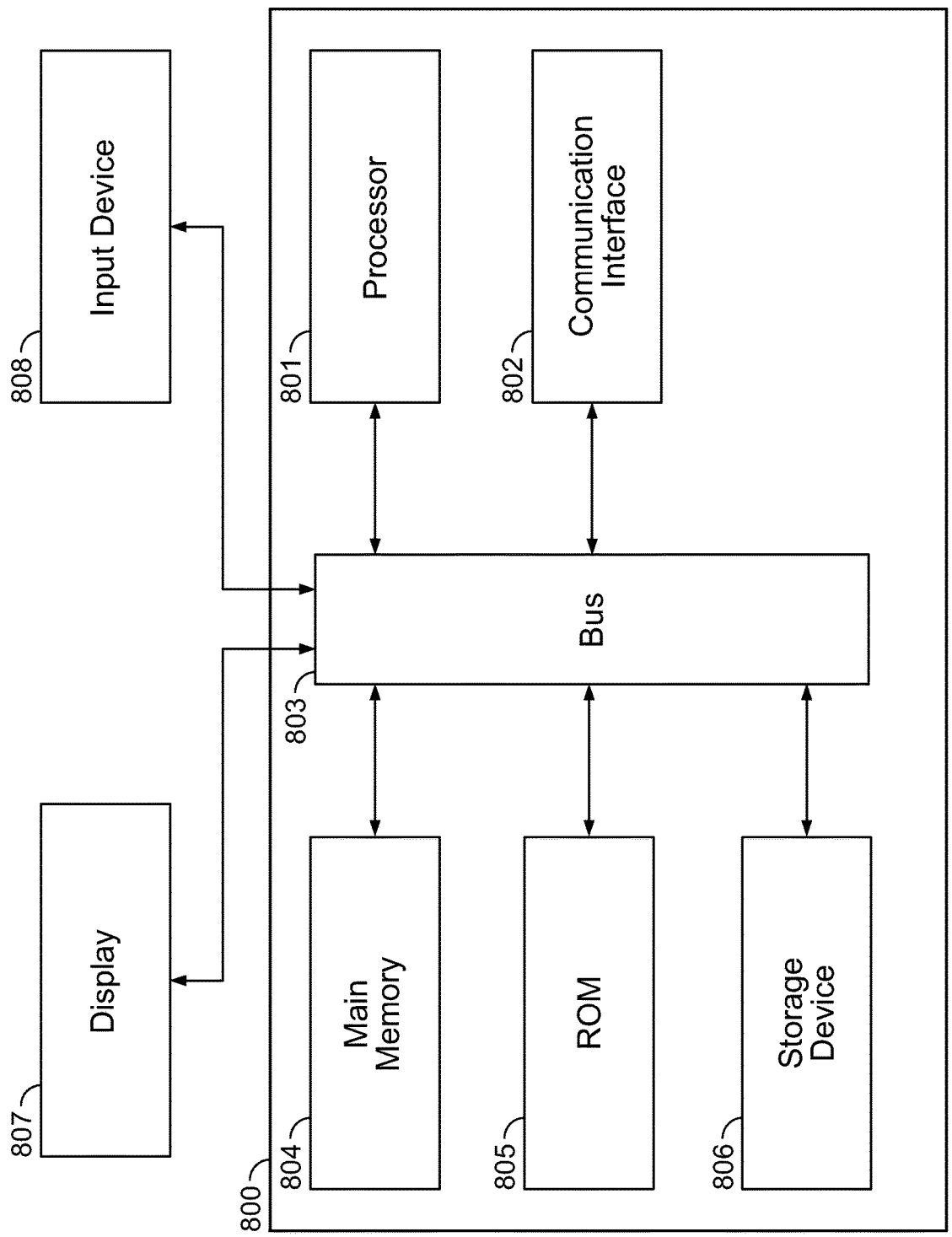
FIG. 8 is a block diagram of a device according to at least one embodiment.

With reference to FIG. 8, an illustration of an example computer 800 is provided. One or more of the devices 704, 705, 706, 707, 708 of the system 700 may be configured as or include such a computer 800. In addition, one or more components of the system 200 of FIG. 2 may be configured as or include the computer 800.

In selected embodiments, the computer 800 may include a bus 803 (or multiple buses) or other communication mechanism, a processor 801, main memory 804, read only memory (ROM) 805, one or more additional storage devices 806, and/or a communication interface 802, or the like or sub-combinations thereof. Embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In all embodiments, the various components described herein may be implemented as a single component, or alternatively may be implemented in various separate components.

The bus 803 or other communication mechanism, including multiple such buses or mechanisms, may support communication of information within the computer 800. The processor 801 may be connected to the bus 803 and process information. In selected embodiments, the processor 801 may be a specialized or dedicated microprocessor configured to perform particular tasks in accordance with the features and aspects described herein by executing machine-readable software code defining the particular tasks. Main memory 804 (e.g., random access memory—or RAM—or other dynamic storage device) may be connected to the bus 803 and store information and instructions to be executed by the processor 801. Main memory 804 may also store temporary variables or other intermediate information during execution of such instructions.

ROM 805 or some other static storage device may be connected to a bus 803 and store static information and instructions for the processor 801. The additional storage device 806 (e.g., a magnetic disk, optical disk, memory card, or the like) may be connected to the bus 803. The main memory 804, ROM 805, and the additional storage device 806 may include a non-transitory computer-readable medium holding information, instructions, or some combination thereof—for example, instructions that, when executed by the processor 801, cause the computer 800 to perform one or more operations of a method as described herein. The communication interface 802 may also be connected to the bus 803. A communication interface 802 may provide or support two-way data communication between the computer 800 and one or more external devices (e.g., other devices contained within the computing environment).

In selected embodiments, the computer 800 may be connected (e.g., via the bus 803) to a display 807. The display 807 may use any suitable mechanism to communicate information to a user of a computer 800. For example, the display 807 may include or utilize a liquid crystal display (LCD), light emitting diode (LED) display, projector, or other display device to present information to a user of the computer 800 in a visual display. One or more input devices 808 (e.g., an alphanumeric keyboard, mouse, microphone) may be connected to the bus 803 to communicate information and commands to the computer 800. In selected embodiments, one input device 808 may provide or support control over the positioning of a cursor to allow for selection and execution of various objects, files, programs, and the like provided by the computer 800 and displayed by the display 807.

The computer 800 may be used to transmit, receive, decode, display, etc. one or more video files. In selected embodiments, such transmitting, receiving, decoding, and displaying may be in response to the processor 801 executing one or more sequences of one or more instructions contained in main memory 804. Such instructions may be read into main memory 804 from another non-transitory computer-readable medium (e.g., a storage device).

Execution of sequences of instructions contained in main memory 804 may cause the processor 801 to perform one or more of the procedures or steps described herein. In selected embodiments, one or more processors in a multi-processing arrangement may also be employed to execute sequences of instructions contained in main memory 804. Alternatively, or in addition thereto, firmware may be used in place of, or in connection with, software instructions to implement procedures or steps in accordance with the features and aspects described herein. Thus, embodiments in accordance with features and aspects described herein may not be limited to any specific combination of hardware circuitry and software.

Non-transitory computer readable medium may refer to any medium that participates in holding instructions for execution by the processor 801, or that stores data for processing by a computer, and include all computer-readable media, with the sole exception being a transitory, propagating signal. Such a non-transitory computer readable medium may include, but is not limited to, non-volatile media, volatile media, and temporary storage media (e.g., cache memory). Non-volatile media may include optical or magnetic disks, such as an additional storage device. Volatile media may include dynamic memory, such as main memory. Common forms of non-transitory computer-readable media may include, for example, a hard disk, a floppy disk, magnetic tape, or any other magnetic medium, a CD-ROM, DVD, Blu-ray or other optical medium, RAM, PROM, EPROM, FLASH-EPROM, any other memory card, chip, or cartridge, or any other memory medium from which a computer can read.

In selected embodiments, the communication interface 802 may provide or support external, two-way data communication to or via a network link. For example, the communication interface 802 may be a wireless network interface controller or a cellular radio providing a data communication network connection. Alternatively, the communication interface 802 may include a LAN card providing a data communication connection to a compatible LAN. In any such embodiment, the communication interface 802 may send and receive electrical, electromagnetic, or optical signals conveying information.

A network link may provide data communication through one or more networks to other data devices (e.g., client devices as shown in the computing environment 700). For example, a network link may provide a connection through a local network of a host computer or to data equipment operated by an Internet Service Provider (ISP). An ISP may, in turn, provide data communication services through the Internet. Accordingly, a computer 800 may send and receive commands, data, or combinations thereof, including program code, through one or more networks, a network link, and communication interface 802. Thus, the computer 800 may interface or otherwise communicate with a remote server (e.g., server 701), or some combination thereof.

The various devices, modules, terminals, and the like described herein may be implemented on a computer by execution of software comprising machine instructions read from computer-readable medium, as discussed above. In certain embodiments, several hardware aspects may be implemented using a single computer; in other embodiments, multiple computers, input/output systems and hardware may be used to implement the system.

For a software implementation, certain embodiments described herein may be implemented with separate software modules, such as procedures and functions, each of which performs one or more of the functions and operations described herein. The software codes can be implemented with a software application written in any suitable programming language and may be stored in memory and executed by a controller or processor.

The foregoing described embodiments and features are merely exemplary and are not to be construed as limiting the present invention. The present teachings can be readily applied to other types of apparatuses and processes. The description of such embodiments is intended to be illustrative, and not to limit the scope of the claims. Many alternatives, modifications, and variations will be apparent to those skilled in the art.

What is claimed is:

1. A method of providing an output manifest representing a video channel, the method comprising:
receiving, from a channel requester, a request for the output manifest;
receiving a plurality of input manifests including a first input manifest corresponding to a first live source of a plurality of live sources and a second input manifest corresponding to a second live source of the plurality of live sources, the first live source and the second live source being different from each other;
creating the output manifest in response to receiving the request,
wherein creating the output manifest comprises:
selecting at least one segment of the first input manifest corresponding to the first live source, the at least one segment of the first input manifest bordered by a first marker comprising a first Society of Cable Telecommunications Engineers (SCTE)-35 marker;
selecting at least one segment of the second input manifest corresponding to the second live source that is different from the first live source, the at least one segment of the second input manifest bordered by a second marker comprising a second SCTE-35 marker, the second marker being common to the first marker, in that the first SCTE-35 marker and the second SCTE-35 marker are aligned with respect to time, and the first SCTE-35 marker and the second SCTE-35 marker are aligned to a same time in a particular time zone; and
creating the output manifest to include the at least one segment of the first input manifest followed by the at least one segment of the second input manifest; and
providing the output manifest to the channel requester, wherein:
with respect to the first input manifest, a segment of the at least one segment of the first input manifest is immediately followed by the first SCTE-35 marker; and
with respect to the second input manifest, a segment of the at least one segment of the second input manifest is immediately prefaced by the second SCTE-35 marker.

2. The method of claim 1, wherein:
the channel requester comprises a network affiliate or a network station; and
providing the output manifest to the channel requester facilitates a broadcast of the video channel by the network affiliate or by the network station to a client terminal.

3. The method of claim 2, wherein the client terminal comprises a television, a desktop computer, a laptop computer, a tablet computer, a mobile smartphone, a personal media device, a wearable device, a set top box receiver, a streaming Internet content device, or a satellite television receiver.

4. The method of claim 1, wherein creating the output manifest further comprises:
determining that the first marker and the second marker are aligned in time, wherein:
the output manifest includes the at least one segment of the first input manifest followed by the at least one segment of the second input manifest to facilitate a switching, in the video channel, from the first live source to the second live source without interruption.

5. The method of claim 4, wherein:
the plurality of input manifests further comprises a third input manifest corresponding to a prerecorded source and the third input manifest comprises a third marker indicating a beginning of a program; and
creating the output manifest further comprises:
determining to switch from the second live source to the prerecorded source after a time associated with the second marker,
wherein the output manifest further includes a segment of the third input manifest to facilitate a switching, in the video channel, from the second live source to the prerecorded source.

6. The method of claim 4, wherein:
the plurality of input manifests further comprises a third input manifest corresponding to a prerecorded source and the third input manifest comprises a third marker; and
creating the output manifest further comprises:
determining to switch from the prerecorded source to the first live source after a time associated with the third marker,
wherein the output manifest further includes a segment of the third input manifest to facilitate a switching, in the video channel, from the prerecorded source to the first live source.

7. The method of claim 1, wherein each of the first input manifest and the second input manifest lists a plurality of HTTP Live Streaming (HLS) video segments.

8. The method of claim 7, wherein each of the at least one segment of the first input manifest and the at least one segment of the second input manifest comprises an HLS video segment.

9. The method of claim 1, wherein
the at least one segment of the second input manifest is further bordered by a third marker; and
creating the output manifest further comprises:
selecting a segment of a third input manifest, the third input manifest segment bordered by a fourth marker common to the third marker; and
creating the output manifest to further include the third input manifest segment following the at least one segment of the second input manifest.

10. The method of claim 1, wherein the creation of the output manifest is based on schedule information corresponding to the channel requester.

11. The method of claim 1, wherein, in the output manifest, the at least one segment of the first input manifest and the at least one segment of the second input manifest are separated by either the first marker or the second marker.

12. An apparatus for producing an output manifest representing a video channel, the apparatus comprising:
a network communication unit configured to transmit and receive data; and
one or more controllers configured to:
receive, from a channel requester, a request for the output manifest;
receive a plurality of input manifests including a first input manifest corresponding to a first live source of a plurality of live sources and a second input manifest corresponding to a second live source of the plurality of live sources, the first live source and the second live source being different from each other;
create the output manifest in response to receiving the request,
wherein the one or more controllers create the output manifest by:

selecting at least one segment of the first input manifest corresponding to the first live source, the at least one segment of the first input manifest bordered by a first marker comprising a first Society of Cable Telecommunications Engineers (SCTE)-35 marker;

selecting at least one segment of the second input manifest corresponding to the second live source that is different from the first live source, the at least one segment of the second input manifest bordered by a second marker comprising a second SCTE-35 marker, the second marker being common to the first marker, in that the first SCTE-35 marker and the second SCTE-35 marker are aligned with respect to time, and the first SCTE-35 marker and the second SCTE-35 marker are aligned to a same time in a particular time zone; and creating the output manifest to include the at least one segment of the first input manifest followed by the at least one segment of the second input manifest; and provide the output manifest to the channel requester, wherein:

with respect to the first input manifest, a segment of the at least one segment of the first input manifest is immediately followed by the first SCTE-35 marker; and with respect to the second input manifest, a segment of the at least one segment of the second input manifest is immediately prefaced by the second SCTE-35 marker.

13. The apparatus of claim 12, wherein:

the channel requester comprises a network affiliate or a network station; and providing the output manifest to the channel requester facilitates a broadcast of the video channel by the network affiliate or by the network station to a client terminal.

14. The apparatus of claim 12, wherein each of the first input manifest and the second input manifest lists a plurality of HTTP Live Streaming (HLS) video segments.

15. The apparatus of claim 14, wherein each of the at least one segment of the first input manifest and the at least one segment of the second input manifest comprises an HLS video segment.

16. A machine-readable non-transitory medium having stored thereon machine-executable instructions for providing an output manifest representing a video channel, the instructions comprising:

receiving, from a channel requester, a request for the output manifest;

receiving a plurality of input manifests including a first input manifest corresponding to a first live source of a plurality of live sources and a second input manifest corresponding to a second live source of the plurality of live sources, the first live source and the second live source being different from each other;

creating the output manifest in response to receiving the request, wherein creating the output manifest comprises:

selecting at least one segment of the first input manifest corresponding to the first live source, the at least one segment of the first input manifest bordered by a first marker comprising a first Society of Cable Telecommunications Engineers (SCTE)-35 marker;

selecting at least one segment of the second input manifest corresponding to the second live source that is different from the first live source, the at least one segment of the second input manifest bordered by a second marker comprising a second SCTE-35 marker, the second marker being common to the first marker, in that the first SCTE-35 marker and the second SCTE-35 marker are aligned with respect to time, and the first SCTE-35 marker and the second SCTE-35 marker are aligned to a same time in a particular time zone; and creating the output manifest to include the at least one segment of the first input manifest followed by the at least one segment of the second input manifest; and providing the output manifest to the channel requester, wherein:

with respect to the first input manifest, a segment of the at least one segment of the first input manifest is immediately followed by the first SCTE-35 marker; and with respect to the second input manifest, a segment of the at least one segment of the second input manifest is immediately prefaced by the second SCTE-35 marker.

* * * * *